No. 656,881. Patented Aug. 28, 1900.
J. J. CLAIRMONT.
EYEGLASSES.
(Application filed Jan. 26, 1899.)
(No Model.)

WITNESSES:

INVENTOR
Joseph J. Clairmont
BY
Kenyon & Kenyon
ATTORNEYS

UNITED STATES PATENT OFFICE.

JOSEPH J. CLAIRMONT, OF NEW YORK, N. Y.

EYEGLASSES.

SPECIFICATION forming part of Letters Patent No. 656,881, dated August 28, 1900.

Application filed January 26, 1899. Serial No. 703,406. (No model.)

*To all whom it may concern:*

Be it known that I, JOSEPH J. CLAIRMONT, a citizen of the United States, and a resident of the city, county, and State of New York, have invented certain new and useful Improvements in Eyeglasses, of which the following is a specification.

My invention relates to improvements in eyeglasses, and especially to that class of eyeglasses having adjustable nose-clips arranged out of plane with the lenses; and its object is to provide nose-clips which shall securely anchor the eyeglasses in place upon the nose and at the same time afford a high degree of comfort to the wearer by reason of their wide capacity for permanent adjustment, their pliability and simplicity of structure, and their extent and variability of contact and pressure. These advantages are secured by so constructing the nose-clips that they shall have a comparatively-large extent of bearing-surface so disposed that in every direction each clip shall have two separated points or surfaces bearing against the nose, or substantially so, and that they shall be universally adjustable by reason of their pliability. In the preferred form my nose-clips are composed of a single continuous piece of pliable material, pliable metal being the best for this purpose, and having somewhat the shape of a triangle with more or less widely-rounded corners. The shape, however, may be greatly varied without a sacrifice of the essential characteristics or advantages of the invention.

Figure 1:
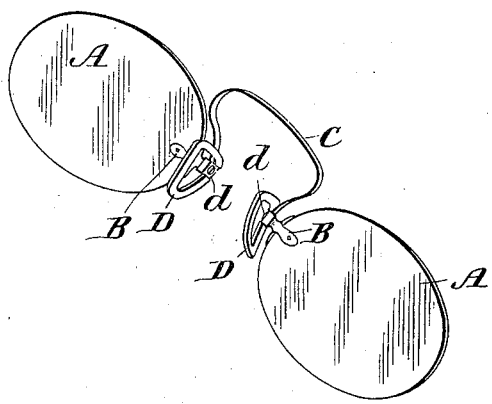
Figures 2, 3:
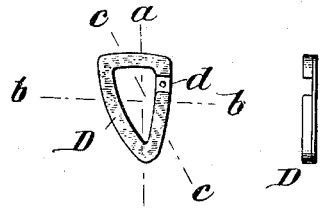
Figure 7:
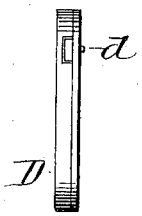

In the accompanying drawings, Figure 1 represents a perspective view of a pair of eyeglasses with my invention in its preferred form attached thereto. Fig. 2 is a front view showing one of the two nose-clips in detail, and Fig. 3 is a side view thereof. Figs. 4 to 7, inclusive, are detail views illustrating modifications of the nose-clips.

The lenses, the lens-frames, if any are used, the spring, and the stud for attaching the spring and the nose-clips to the lenses or lens-frames may be made in any approved form, since my invention relates only to the characteristics of the nose-clips.

In the drawings, A A are the lenses.

B B are studs fastened to the lenses in any well-known way. To the inner ends of the studs the ends of the commonly-used elastic spring or bow C are attached, also in any well-known way, there being usually a depression in the inner ends of the studs for receiving the ends of the said spring. The same depression in the studs is commonly made use of for seating and securing the nose-clips D to the stud, a single screw being, in the form shown in the drawings, sufficient to secure both the spring and the nose-clips to the stud.

Figure 4:
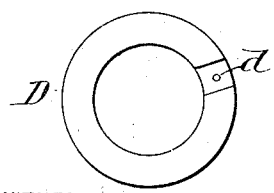
Figure 5:
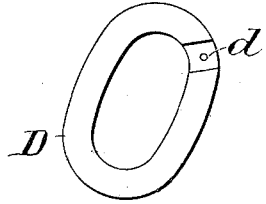
Figure 6:
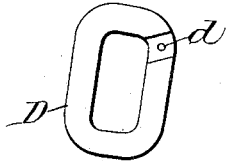

Fig. 2 shows in detail my improved nose-clip D in its preferred form. It is there seen to be composed of a single continuous piece shaped like a triangle with rounded corners. It will be observed that such a nose-clip has two separated bearing points or surfaces upon the nose in any direction whatsoever, or substantially so—as, for example, along lines $a\ a$, $b\ b$, $c\ c$, &c. The shape may be greatly varied. For example, the clip may be circular, as shown in Fig. 4, or elliptical, as shown in Fig. 5, or rectangular, as shown in Fig. 6, or any other substantially ring-like shape, provided that in every direction there be two separated broad bearing-surfaces. Such a disposition of bearing-surfaces results in a nose-clip whose separated surfaces throughout the whole perimeter of the clip mutually support and relieve one another. At the point $d$ the material of the clip is ordinarily depressed over a very limited extent to form a receptacle for the screw-head; but this depression is not an essential feature. It is of importance, however, that metal shall not come in contact with the nose, because it is uncomfortable, and, moreover, injurious to the tissues, especially in case of oxidation of the metal. It is for these and other reasons that the metal nose-clip is usually padded with tortoise-shell, celluloid, cork, or some other substance not open to these objections. The pad should be substantially ring like and should cover substantially the whole surface of the metal base-piece, so as to present in every direction two separate broad bearing-surfaces. In case there be no depression in the nose-clip the shell or other pad may end on either side of the screw, as shown in Figs. 2 to 6, inclusive, and being as thick or thicker than the screw-head will thus prevent injury to the tissues, or the screw may be countersunk in the depression deep enough to allow of the shell-pad to be carried right across over the head of the screw and be in one continuous piece, as clearly shown in Fig. 7. The same object may be accomplished by inserting the screw through the stud from the opposite direction, with the screw end flush with the metallic surface of the clip. Pliability is imparted to my improved nose-clip by constructing it of pliable material. It follows from the above that the nose-clip as a whole may be set in any plane required by the shape of the nose and corresponding or not with the plane of the opposing nose-clip, and, moreover, any particular part of either clip may be adjusted by bending, so as to increase or relieve pressure at any desired point. The nose-clips are preferably secured to the lenses at or near one corner and so arranged that another corner of the clips projects inwardly with relation to the plane of the glasses, as shown. Being of one continuous ring-like piece of pliable material and disposed as above described, each clip may be caused to rest throughout in a cushion-like manner upon the tissues of the nose, and so not be open to the many objections of loose sharp ends or corners, which are apt to cause discomfort to the wearer. A nose-clip unitary in character and light in weight is thus obtained which has all the anchorage possessed by double or duplicate nose-clips without their disadvantages. It is, moreover, sufficiently flexible and pliable and adaptable to any size or conformation of nose, has a large bearing-surface better distributed and a gentle contact over the whole surface, and the nose is securely protected from contact with the fastening devices.

It may be remarked that tortoise-shell is sufficiently pliable for use as the pads of my improved nose-clips. A slight warmth—as, for example, above an alcohol-lamp—makes it temporarily quite pliable.

What I claim as new, and desire to secure by Letters Patent, is—

The combination with a pair of eyeglasses and a mounting therefor, of nose-clips, each consisting of a continuous substantially ring-like base-piece of pliable metal, means for detachably fastening said base-piece at one side directly to the mounting so that substantially all of the clip is located to one side of the plane of the eyeglasses, and a separate pliable ring-like pad-piece secured to the base-piece and covering the surface thereof, said base and pad pieces being so shaped as to form a broad substantially-continuous bearing-surface presenting in every direction two separated broad bearing-surfaces substantially as described.

In testimony whereof I have signed my name to this specification in the presence of two subscribing witnesses.

JOSEPH J. CLAIRMONT.

Witnesses:
HARRY POILLON NICHOLS,
EDWIN SEGER.